United States Patent [19]

Baker

[11] Patent Number: 4,654,148

[45] Date of Patent: Mar. 31, 1987

[54] PROCESS FOR THE REMOVAL OF IRON CYANIDE COMPLEX OR COMPLEXES FROM AN AQUEOUS SOLUTION

[75] Inventor: Daniel C. Baker, Houston, Tex.

[73] Assignee: Shell Oil Company, Houston, Tex.

[21] Appl. No.: 814,709

[22] Filed: Dec. 30, 1985

[51] Int. Cl.$^4$ ............................................... C02F 1/02
[52] U.S. Cl. ..................................... 210/766; 210/904; 423/140; 423/366; 423/367; 423/659; 423/236
[58] Field of Search ............... 210/749, 766, 904, 912; 423/140, 143, 236, 366, 367

[56] References Cited

U.S. PATENT DOCUMENTS

| | | | |
|---|---|---|---|
| 4,505,881 | 3/1985 | Diaz | 423/236 |
| 4,508,683 | 4/1985 | Doll et al. | 210/904 |

*Primary Examiner*—Richard V. Fisher
*Assistant Examiner*—Jeffrey W. Peterson
*Attorney, Agent, or Firm*—Albert J. Adamcik

[57] ABSTRACT

A process for removal of iron cyanide complex or complexes from a solution is described, the process being characterized by contact of the solution containing the complex or complexes with ammonium polysulfide or sodium polysulfide, or a mixture thereof, at a temperature of from about 110° C. to about 180° C.

5 Claims, No Drawings

PROCESS FOR THE REMOVAL OF IRON CYANIDE COMPLEX OR COMPLEXES FROM AN AQUEOUS SOLUTION

BACKGROUND OF THE INVENTION

The presence of cyanide complexes in various industrial streams, such as process or effluent streams, poses significant problems of removal or disposal. In particular, these materials may interfere with further process steps, and environmental restrictions severely limit their waste effluent concentrations. With regard to waste treatment, their long term stability renders them unsuitable for standard biological waste procedures. With regard to waste effluent disposal, their toxicity or the toxicity of their derivatives or decomposition products renders them unsuitable for discharge to the environment. Accordingly, a method or process for removal of these undesirable species from aqueous solutions could have significant economic importance. The invention is such a process.

SUMMARY OF THE INVENTION

Briefly, the invention relates to a process for the removal of iron cyanide complex or complexes from aqueous solutions, in which process the aqueous solution containing the iron cyanide complex or complexes is heated in a contact or conversion zone, preferably in a closed system or vessel, with ammonium or sodium polysulfide, or mixtures thereof, at a temperature of from about 110° C. to about 180° C. The low temperature contacting produces a solution or mixture having substantially reduced iron cyanide complex or complexes content or concentration. As used herein, the term "iron cyanide complex" or "iron cyanide complexes" refers to either of or both the ferrocyanide ion, $[Fe^{II}(CN)_6]^{-4}$, and the ferricyanide ion, $[Fe^{III}(CN)_6]^{-3}$. The reactions, in the case of ammonium polysulfide, may be shown, as follows:

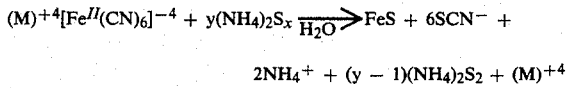

wherein (M) is a metal ion or ions, or $NH_4+$, and x is 3, 4 or 5, and y is 4, 2 and 4/3 respectively, or

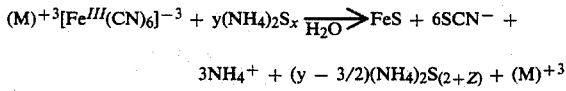

wherein (M) is a metal ion or ions or $NH_4+$, and x is 3, 4, or 5, while y is 4, 2 and 4/3, respectively and Z is $$\left( \frac{1}{y - 3/2} \right).$$

(M) will be any available metal ions or ammonium ion in solution providing the appropriate charge balance, suitable metal ions including the ions of Na, K, Li, Ca, Mg, Al, Sn, etc.

The invention may be practiced with an suitable aqueous solution containing the iron cyanide complex or complexes. In general, any aqueous solution containing the iron cyanide complex or complexes, and which does not contain substantial concentrations of other components which react with or interfere substantially with the polysulfide(s) employed, may be used, as will be understood by those skilled in the art. Particularly preferred are scrubbing solutions from gas scrubbing steps in the purification of synthesis gas, as described in my copending applications, U.S. Ser. No. 814,707, entitled "Particulates and Iron Cyanide Complex Removal", filed even date herewith, and U.S. Ser. No. 814,708, entitled "HCN and Iron Cyanide Complex Removal", also filed even date herewith, and bleed water streams from such processes. Thus, the solutions treated may contain a variety of non-interfering components, such as soot and carbon, and other types of streams may be treated. However, the streams treated according to the invention should preferably have reduced levels of or be free or substantially free of easily reactable cyanide materials, e.g., free cyanide, undissociated (HCN), and dissociated (CN−), referred to collectively as free cyanide species. While any or all of these components may be present to a limited extent, the polysulfide will react preferentially therewith, thus reducing the efficiency of the process. The solutions may contain materials that enhance polysulfide formation. The concentrations of the iron cyanide complex or complexes in the solutions treated are not critical, and may range from detectable or minimal impurity amounts, e.g., less than about 1 ppm by weight, to the solubility limits of the complex or complexes. Generally, the concentrations will range from about 1 to about 200 ppm, preferably 10 to 50 ppm, all by weight.

As indicated, the conversion temperatures will range from about 110° C. to about 180° C., preferably from about 120° C. to about 150° C. The low temperatures of conversion, which result from the use of polysulfide to remove cyanide from the complex or complexes, represent a real energy advantage of the invention.

The process of the invention may be carried out batchwise or continuously, but is preferably carried out continuously. In such case, make-up ammonium or polysulfide (or a mixture thereof) is continuously supplied to the contact or conversion zone, and a portion or "bleed" of solution is removed from the contact zone. Whether batch or continuous, the contacting and conversion are carried out for a time sufficient to convert at least the bulk of the cyanide complex or complexes present, and to reduce the concentration of the cyanide complex or complexes to the level desired. This time may vary with the concentrations and actual temperatures employed. Obviously, longer or shorter residence times may be employed than those suggested hereinafter, it not being intended by the specification of appropriate residence times to limit the invention. In the case of a batch operation, a suitable total reaction or residence time, assuming a well stirred system, may range from a few minutes to several hours, preferably about 10 minutes to about one hour. In the case of a continuous operation, the contacting and conversion are carried out in such manner that a given portion of solution in passing through the reaction zone has an average residence time as indicated, supra. Turbulent flow reactors may be utilized, or a well stirred vessel is also suitable. As noted, the system is preferably closed. Pressures in the conversion zone are not critical, and may range from below atmospheric to 100 atmospheres or more. Preferably, pressures will range from atmospheric to 5 or 10 atmospheres.

Either ammonium polysulfide or sodium polysulfide, or a mixture thereof, may be used, although ammonium polysulfide is preferred. The polysulfide will preferably be supplied as a solution, although the polysulfide may be generated in situ in the mixture or solution in the conversion or contact zone by reaction of suitable precursors. The polysulfide solution will preferably have a pH of from about 8 to 10, most preferably from 8.5 to 9.5. The pH of the aqueous solutions treated may be widely variable, but will preferably range from 7 to 11, most preferably 8.5 to 9.5, and may be adjusted to this range, if desired. Concentrations of the polysulfide are not critical, but solution will range from 0.01 to 1, preferably 0.1 to 0.5 moles per liter. The polysulfide solution may be added to the aqueous solution containing iron cyanide complex or complexes prior to entry into the hydrolysis zone. In general, the polysulfide solution will contain at least a stoichiometric amount of the polysulfide sulfur with respect to the iron cyanide complex or complexes, and preferably up to 3 or 4 times the stoichiometric amount. Elemental sulfur may be supplied in the contact or hydrolysis zone to maintain this concentration.

It is an advantage of the invention that the products of the conversion may be sent to biotreatment.

The following experiments were conducted.

EXPERIMENT I

Fifty (50) multiliters of an aqueous slurry of flyash particulates (pH 7.5) containing 15 ppm by weight of iron cyanide complex was heated for 15 minutes at 170° C. in a closed vessel with an amount of ammonium polysulfide which was in stoichiometric excess with respect to the iron cyanide complex. Analysis of the product mixture indicated that thiocyanate ion was produced, but detectable amounts of the complex were not observed.

EXPERIMENT II

In a similar experiment, in the absence of polysulfide, only approximately 50 percent of the iron cyanide complex was converted by the heating. The product of the conversion was ammonium formate.

What is claimed is:

1. A process for the removal of iron cyanide complex or complexes from an aqueous solution comprising heating a solution containing said complex or complexes in a conversion zone with ammonium polysulfide or sodium polysulfide or a mixture thereof, at a temperature of from 110° C. to 180° C., producing a mixture having a reduced concentration of iron cyanide complex or complexes.

2. The process of claim 1 wherein the solution is at least substantially free of free cyanide species.

3. The process of claim 1 wherein the ammonium polysulfide, sodium polysulfide, or mixture thereof is supplied to the conversion zone as a solution.

4. A process for the removal of iron cyanide complex or complexes from an aqueous solution comprising adding ammonium polysulfide or sodium polysulfide, or a mixture thereof, to a solution containing said complex or complexes, and heating the resultant mixture in a conversion zone at a temperature of from 110° C. to 180° C., producing a mixture having a reduced concentration of iron cyanide complex or complexes.

5. The process of claim 4 wherein the mixture is at least substantially free of free cyanide species.

* * * * *